Sept. 7, 1937.   A. J. SEYS   2,092,593
TOW ROD FOR AUTOMOBILES
Filed June 1, 1936
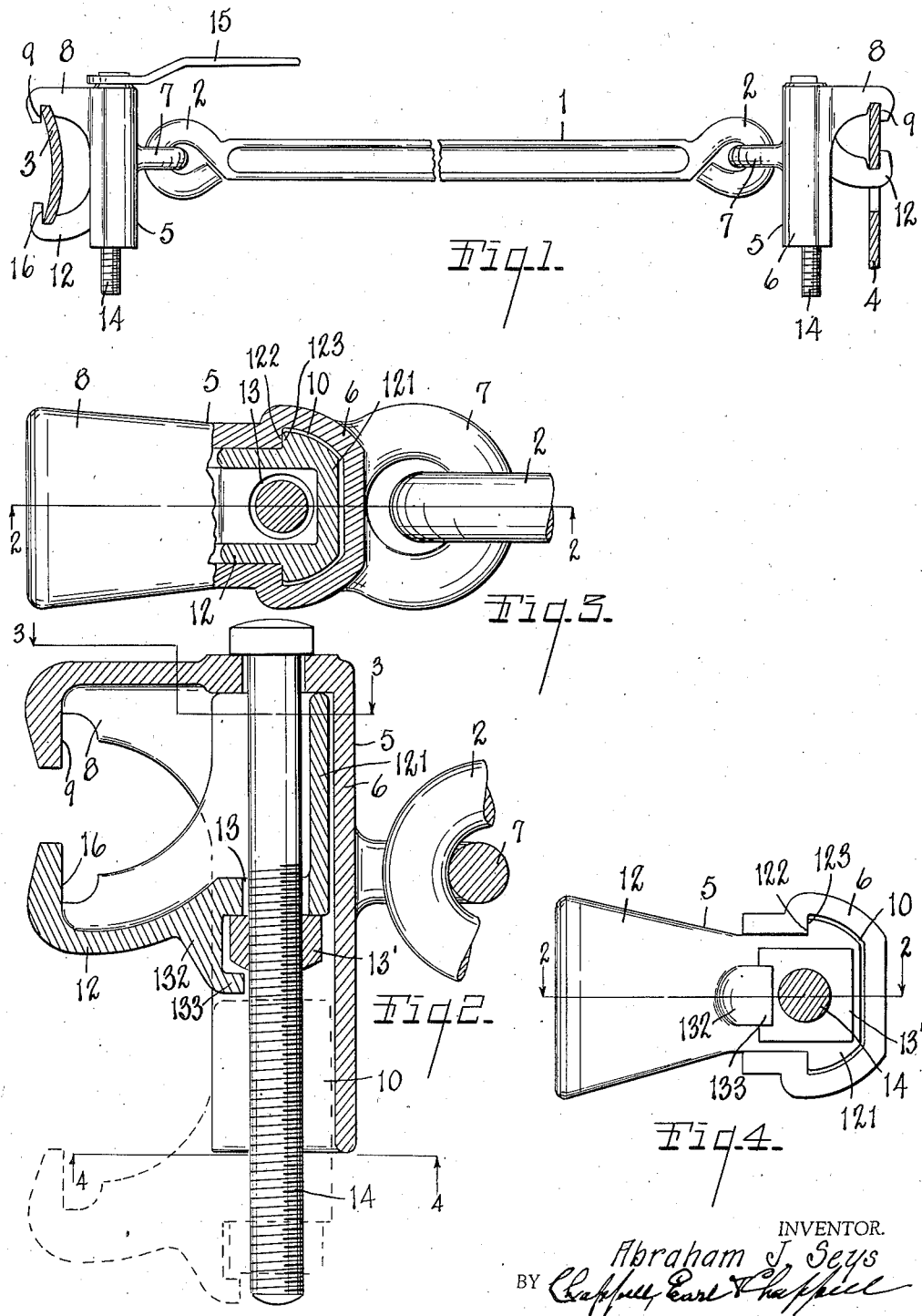
INVENTOR.
Abraham J. Seys
BY Chappell, Earl & Chappell
ATTORNEYS Patented Sept. 7, 1937

2,092,593

UNITED STATES PATENT OFFICE 2,092,593

TOW ROD FOR AUTOMOBILES

Abraham J. Seys, Grand Rapids, Mich.

Application June 1, 1936, Serial No. 82,861

3 Claims. (Cl. 280—33.14)

The objects of this invention are,

First, to provide a simple and self-contained structure for such purpose.

Second, to provide a structure with an improved clamping means for engaging the bumper bar of an automobile for towing purposes.

Objects pertaining to details of construction and operation will appear from the description to follow. A structure embodying my invention is illustrated in the accompanying drawing, in which:

Fig. 1 is an elevation view of the tow device coupling the back bumper bar of one automobile to the front bumper bar of another automobile.

Fig. 2 is an enlarged vertical sectional view of one of the clamps, enlarged to about full size, taken on line 2—2 of Figs. 3 and 4, there being identical clamps at opposite ends of the tow rod.

Fig. 3 is a detail sectional plan view taken on line 3—3 of Fig. 2.

Fig. 4 is an enlarged detail sectional inverted plan view taken on line 4—4 of Fig. 2, being substantially full size.

The parts will be identified by numerals of reference which are the same in all the views.

1 is the tow rod, having eyes 2, 2 at each end in a vertical plane. 3 is the bar of the rear bumper of an automobile and 4 is the bar of the front bumper of an automobile. 5, 5 are the clamps in general. These clamps are each provided with a vertical body portion 6 having an eye 7 in a horizontal plane engaging the eye in each end of the bar 3.

The body 6 is provided with an integral upper jaw 8 containing recesses 9 for receiving the upper edge of the bumper bar 3, the front clamp being illustrated. The body 6 of the clamp is hollowed out at 10 and is open at the front, and has vertical shoulder 123 thereon. A movable bottom jaw 12 has a tubular body 121 which is vertically shouldered at 122, slidably engaging the shoulder 123. The pulling strain is on the coacting shoulders 122 and 123, thereby relieving the strain on the bolt 14. The hollow body 6 is provided with an aperture 13 at the bottom for the adjusting bolt or screw 14, which aperture 13 is engaged by a square nut 13' on the vertical clamping screw 14. The screw 14 is operated by means of the handle or lever 15 at the top thereof.

The jaw 12 is provided with recesses 16 for the engagement of the lower edge of the bumper bar 3. A projection 132 carries lug 133 which engages the nut 13' and causes the lower jaw to be operated thereby. Because of the hollow bodies reciprocating within each other, the clamps move readily toward or from each other by the action of the screw and when the screw is drawn tight the clamping bodies inter-engage and avoid undue strain on the threads of the bolt when clamping on the bumper bar.

It will thus be seen that the tow rod is an entirety, even the handles or levers for manipulating the bolts being completely organized. The bar is readily secured to the front and rear bumpers of automobiles when the rod 1 thereof acts as a pull or push bar, depending on which direction the automobiles are traveling. The structure is capable of being put in a tool box ready for instant use and takes the place satisfactorily, so far as pleasure automobiles are concerned, of tow lines and various attachments in that behalf. It is further of advantage in that it is a push rod as well as a pull rod.

Having thus described my invention, what I claim as new and desire to secure by Letters Patent is:

1. A draw bar having vertical eyes at opposite ends, a clamp at each end having a horizontal eye engaging the eyes of said draw bar, a main body for the clamp having a fixed jaw on the upper part and having a hollow open-sided body at the lower part thereof, a movable lower jaw with a body telescoping and slidable in said upper body, and a clamping bolt having a clamping nut and having an attached operating lever for clamping the jaws together for engagement at each end with an automobile bumper bar.

2. A draw bar having vertical eyes at opposite ends, a clamp at each end having a horizontal eye engaging the eyes of said draw bar, a main body for the clamp having a fixed jaw on the upper part and having a hollow open-sided body at the lower part thereof, a movable jaw having a body in the said hollow part and formed to engage and cooperate with the same, and a clamping bolt with clamping nut for clamping the jaws together for engagement at each end with an automobile bumper bar.

3. A draw bar having eyes at opposite ends, a clamp at each end having an eye engaging the eyes of said draw bar, a main body for the clamp having a fixed jaw on the upper part and having a hollow open-sided body at the lower part thereof, a movable jaw having a body in the said hollow part and formed to engage and cooperate therewith, a clamping bolt for clamping the jaws together for engagement at each end with an automobile bumper bar, and a clamping nut for sad bolt fixed against rotation in said movable jaw.

ABRAHAM J. SEYS.